United States Patent [19]
Bar

[11] Patent Number: 6,031,698
[45] Date of Patent: Feb. 29, 2000

[54] MULTIPLE PARTITION TAPE CARTRIDGE DETECTION MEANS

[75] Inventor: Refael Bar, San Diego, Calif.

[73] Assignee: Iomega Corporation, Roy, Utah

[21] Appl. No.: 08/950,456

[22] Filed: Oct. 15, 1997

Related U.S. Application Data

[63] Continuation-in-part of application No. 08/872,218, Jun. 10, 1997.
[51] Int. Cl.$^7$ ........................................................ G11B 5/78
[52] U.S. Cl. .......................... 360/134; 360/132; 360/72.2
[58] Field of Search ............................ 360/48, 72.2, 132, 360/134

[56] References Cited

U.S. PATENT DOCUMENTS

| | | | |
|---|---|---|---|
| Re. 35,205 | 4/1996 | Bar | 360/77.13 |
| 3,526,371 | 9/1970 | Blackie et al. | 242/192 |
| 3,692,255 | 9/1972 | Von Behren | 242/192 |
| 3,924,823 | 12/1975 | Cohen et al. | 242/198 |
| 3,932,894 | 1/1976 | Arter et al. | 360/134 |

(List continued on next page.)

FOREIGN PATENT DOCUMENTS

| | | |
|---|---|---|
| 0 347 074 A2 | 12/1989 | European Pat. Off. . |
| 0 406 188 A1 | 1/1991 | European Pat. Off. . |
| 0 637 025 A2 | 2/1995 | European Pat. Off. . |
| 0 721 185 A2 | 7/1996 | European Pat. Off. . |
| 57-191817 | 11/1982 | Japan . |
| 63-241742 | 10/1988 | Japan . |
| 63-259804 | 10/1988 | Japan . |
| 4-186559 | 7/1992 | Japan . |
| WO 97/27585 | 7/1997 | WIPO . |

OTHER PUBLICATIONS

"Flexible–Disk–Controller–Compatible Recording Format for Information Interchange", QIC Development Standard, published by Quarter–Inch Cartridge Drive Standards, Inc., Santa Barbara, CA, QIC–80 Rev. D, Dec. 6, 1989, 1–40.

"Common Command Set Interface Specification for Flexible Disk Controller Based Minicartridge Tape Drivers", QIC Development Standard, published by Quarter–Inch Cartridge Drive Standards, Inc., Santa Barbara, CA, QIC–117 Rev. B, Dec. 6, 1989, 1–29.

"Serial Recorded Magnetic Tape Mimicartridge for Information Interchange", QIC Development Standard, published by Quarter–Inch Cartridge Drive Standards, Inc., Santa Barbara, CA, QIC–3020–MC, Rev. D, Sep. 1, 1994, 1–32.

"Serial Recorded Magnetic Tape Mimicartridge for Information Interchange", QIC Development Standard, published by Quarter–Inch Cartridge Drive Standards, Inc., Santa Barbara, CA, QIC–3020–MC, Rev. H, Mar. 20, 1996, 1–33.

Kennedy, R., "Medium Types ad Density Codes Revision E", Quarter–Inch Cartridge Drive Standards, Inc., QIC 95–101, Hewlett Packard, Sep. 25, 1997, 1–11.

*Primary Examiner*—William J. Klimowicz
*Attorney, Agent, or Firm*—Woodcock Washburn Kurtz Mackiewicz & Norris LLP

[57] ABSTRACT

A tape cartridge has a tape detection means embedded therein. The tape detection means comprises a plurality of tape identification holes, preferably in octal 06 arrangement, and a single load point hole located about 30 inches from the nearest set of beginning of tape holes. A method of detecting a tape cartridge with a tape detection means embedded therein comprises the steps of: locating a set of beginning of tape holes; locating a load point hole that is 30 inches from the nearest set of beginning of tape holes; measuring the length of tape between the load point hole and the beginning of tape holes; if the length of tape is between 28 and 32 inches determining whether tape identification holes in octal 06 arrangement are present; and identifying the tape as a valid tape cartridge if the length of tape is between 28 and 32 inches and tape identification holes in octal 06 arrangement are present. An apparatus for detecting a tape cartridge with a tape detection means embedded therein comprises a tape identification transducer for reading and scanning for the tape detection data and a microprocessor electrically connected to the tape identification transducer for responding to signals from the transducer.

17 Claims, 8 Drawing Sheets

U.S. PATENT DOCUMENTS

| | | | |
|---|---|---|---|
| 4,011,587 | 3/1977 | Arter et al. | 360/62 |
| 4,040,100 | 8/1977 | Chan | 360/43 |
| 4,054,947 | 10/1977 | Shanks et al. | 364/900 |
| 4,298,897 | 11/1981 | Arter et al. | 360/39 |
| 4,404,601 | 9/1983 | Sakamoto | 360/77.13 |
| 4,439,800 | 3/1984 | Powell | 360/78 |
| 4,484,237 | 11/1984 | Muto | 360/25 |
| 4,498,129 | 2/1985 | Velazquez | 360/174 |
| 4,586,094 | 4/1986 | Chambors et al. | 360/77 |
| 4,646,175 | 2/1987 | Sokolik et al. | 360/78 |
| 4,647,994 | 3/1987 | Irwin et al. | 360/85 |
| 4,811,122 | 3/1989 | Kido et al. | 360/25 |
| 4,819,092 | 4/1989 | Richards | 360/27 |
| 4,863,114 | 9/1989 | Moeller | 242/188 |
| 4,928,192 | 5/1990 | Bartlett et al. | 360/77.08 |
| 4,984,111 | 1/1991 | Rudi | 360/96.5 |
| 5,081,548 | 1/1992 | Inazawa et al. | 360/72.2 |
| 5,210,664 | 5/1993 | Perona | 360/93 |
| 5,218,487 | 6/1993 | Richmond | 360/27 |
| 5,218,691 | 6/1993 | Tuma et al. | 395/500 |
| 5,253,124 | 10/1993 | Kondo et al. | 360/48 |
| 5,268,802 | 12/1993 | Bar | 360/77.13 |
| 5,276,566 | 1/1994 | Clifford, Jr. | 360/75 X |
| 5,289,328 | 2/1994 | Saliba | 360/121 |
| 5,321,570 | 6/1994 | Behr et al. | 360/121 |
| 5,355,259 | 10/1994 | Shih | 360/48 |
| 5,388,016 | 2/1995 | Kanai et al. | 360/72.1 |
| 5,454,098 | 9/1995 | Pisello et al. | 395/500 |
| 5,485,321 | 1/1996 | Leonhardt et al. | 360/48 |
| 5,523,904 | 6/1996 | Saliba | 360/77.12 |
| 5,543,992 | 8/1996 | Hu et al. | 360/132 |
| 5,558,291 | 9/1996 | Anderson et al. | 242/336 |
| 5,602,686 | 2/1997 | Shih | 360/48 |
| 5,757,571 | 5/1998 | Basham et al. | 360/72.1 |

MULTIPLE PARTITION TAPE CARTRIDGE DETECTION MEANS

RELATED APPLICATIONS

This application is a continuation-in-part of commonly assigned U.S. patent application Ser. No. 08/872,218, filed Jun. 10, 1997 pending, entitled "Multiple Partition Tape Cartridge and Drive System," the contents of which are hereby incorporated by reference.

BACKGROUND OF THE INVENTION

This invention relates to cartridge based data storage systems. More particularly, the invention relates to a tape cartridge that can be detected by an improved tape drive as providing random access capabilities.

Cartridge based tape and disk data storage devices have been in use in the computer industry for several decades. Primarily, the cartridge based tape storage devices have been used as sequential access devices, whereby new files are added to the tape by appending them to the last file stored on the tape. During that time, a number of tape cartridge styles emerged. One popular cartridge style is based on a design that is disclosed in U.S. Pat. No. 3,692,255 (Von Behren). That design contains two rotatable reels that are fixed within a rectangular housing. A length of tape is wound around the reels along a predetermined tape path, which extends along a front peripheral edge of the cartridge and across a tape access opening. A drive belt extends around drive belt rollers and contacts a portion of the tape on each reel to move the tape back and forth between the reels and across the tape access opening. A drive puck, positioned near the inside front of the cartridge, contacts a drive roller, which provides a mechanism to move the drive belt.

Tape cartridges and tape drives have become an increasingly important feature in computer systems. The popularity of tape cartridges is driven in part by the large storage capacities and low cost of storage they provide. In general, the storage capacity of a particular tape cartridge is dictated by a variety of factors including the length of tape, the width of the tape, the materials used to produce the tape and the recording density of the tape. Even with the cost and capacity advantages offered by tape storage solutions, the tape drive has primarily found use in computer systems as a back-up device, in which duplicates of files that were originally stored to a random access storage device, such as a hard disk drive, are stored for sequential access on a tape cartridge.

The popularity of these tape drive and cartridges have spawned several tape drive and cartridge standards. One popular tape cartridge and tape drive standard is defined in the specification entitled "QIC-3020-MC" Revision H, Mar. 20, 1996. That standard defines a variety of important features related to tape cartridges such as tape width, recording format, track format, segment format, and so on.

In a typical hard disk drive back-up procedure. Files contained on a hard disk drive are stored on tape in a sequential fashion. That is, each new file is appended after the last file stored on the tape. Thereafter, in the event of a loss of files on the hard drive, the files can be retrieved from the tape and restored to the hard disk drive. Additionally, files that are accessed infrequently can be stored on tape and permanently removed from the hard drive. As a result, valuable hard disk file space is available for more immediate file needs. Because the back-up process can be performed as a background task, the speed of the tape access is generally not the primary concern of the user. Rather, capacity and storage cost are generally more important factors.

While tape storage systems have found substantial use as sequential access storage solutions, the use of tape systems as random access storage solutions has been hindered by slow file access speeds offered by tape storage systems. Tape drive file access speeds are affected by the amount of tape that can be moved across the tape access opening, referred to as tape displacement, and the amount of tape that must be displaced to reach a particular file. Currently available tape cartridges can contain in excess of 1000 feet of tape, and exemplary drives that use cartridges have displacement speeds on the order of about 7 feet per second. Thus, if the tape is positioned near the beginning of the tape and a requested file is near the end of the tape, the access time would take upwards of 140 seconds. For hard disk drive users, accustomed to access times on the order of milliseconds, 140 second access times are unbearable.

While tape drives are mainly used for secondary storage, some tape drive manufacturers offer tape drive systems that provide a mechanism that making a tape drive function more like a primary, random access storage device. For example, Seagate Technology offers a product—sold under the brand name of TAPE-IT—that assigns a drive letter to a tape drive. A user can then copy files to or from the tape drive much the same way that files are copied to a hard disk. The TAPE-IT system operates by first copying selected files to the user's hard disk drive. Through a separate user initiated function, or when the allotted hard disk space is full, the temporary files are moved from the hard disk to the tape. Although the TAPE-IT system attempts to provide users with a random access tape solution, the system actually uses the hard disk, and not the tape, to gain access speed. As a result, when the files are actually written to tape the same slow access speeds result. Moreover, the TAPE-IT system requires additional space on the hard disk drive to operate adequately.

Therefore, there is a need for an improved tape system that offers random access storage at improved access speeds. Furthermore, there is a need for an improved tape cartridge that allows for random access and can be detected by the improved tape system as providing such random access. Finally, there is a need for a method and system for detecting such improved tape cartridges when inserted into the improved tape system.

SUMMARY OF THE INVENTION

Briefly, the present invention is directed to a magnetic tape cartridge having a detection means embedded in the tape of the cartridge for identifying the cartridge as one which allows for random access reading and writing. The magnetic tape cartridge comprises a first and second reel; a length of tape extending along a predefined tape path between the first and second reels; a partition means embedded in the tape indicating a division in the tape between a first partition along a part of the length of tape and a second partition along another part of the length of tape, one of the first and second partition being accessed according to a random access format and another one of the first and second partition being accessed according to a sequential access format; and a detection means embedded in a recording surface of the length of tape indicating that the length of tape contains one partition being accessed according to a random access format and another portion being accessed according to a sequential format. The detection means comprises a plurality of tape identification holes, preferably in octal 06 arrangement, situated in the length of the tape and a load point hole situated about 30 inches away along the length of tape from the nearest set of beginning of tape holes.

According to another aspect of the invention, there is provided a tape drive system that detects whether a tape cartridge with the proper tape detection means has been inserted into the tape drive. The tape drive system comprises a tape cartridge and a tape drive. The tape cartridge tape cartridge has a first and second reels with a length of tape extending along a predefined tape path between said first and second reels. A partition means embedded in the tape indicates a division in the tape between a first partition along a part of the length of tape and a second partition along another part of the length of tape, where one of the first and second partition are accessed according to a random access format and another one of the first and second partition are accessed according to a sequential access format. A tape cartridge detection means embedded in a recording surface of the length of tape indicates that the length of tape contains one partition being accessed according to a random access format and another portion is accessed according to a sequential format. The tape cartridge detection means comprises a plurality of tape identification holes, preferably in octal 06 arrangement and a load point hole situated about 30 inches away along the length of tape from the nearest set of tape identification holes. The tape drive comprises a tape identification transducer for reading the detection information embedded in the tape.

According to further aspect of the present invention, there is provided a method of detecting a tape cartridge having a detection means embedded in a recording surface of the length of tape indicating that the length of tape contains one partition being accessed according to a random access format and another portion being accessed according to a sequential format. The method of detection comprises the steps of: locating the beginning of the tape indicated by beginning of tape holes; locating a first data zone as indicated by the existence of a single load point hole about 30 inches from the nearest set of beginning of tape holes; measuring the length of tape between the beginning of the tape and the first data zone; determining whether the length of tape between the beginning of the tape and the first data zone is between 28 and 32 inches; if the length of the tape is more than 32 inches, identifying the tape as an invalid media type; if the length of the tape is between 28 and 32 inches, determining whether tape identification holes are embedded in the tape; if no tape identification holes are embedded in the tape, identifying the tape as an invalid media type; if tape identification holes are present, determining whether the tape identification holes are in octal 06 arrangement; if the holes are not in octal 06 arrangement, identifying that the tape cartridge is an invalid media type; and if the holes are in octal 06 arrangement, identifying the tape as one having a detection means embedded therein.

According to another aspect of the invention, there is provided an apparatus for detecting a tape cartridge with a detection means embedded in a recording surface of a length of tape which indicates that the length of tape contains one partition being accessed according to a random access format and another portion being accessed according to a sequential format. The apparatus comprises: a drive application specific integrated circuit containing a microprocessor and memory; hole sensors electrically connected to the integrated circuit; hole sensor electronics electrically connected to the hole sensors and the integrated circuit; and firmware electrically connected to the integrated circuit and the hole sensor electronics. The firmware contains software for executing the following steps: locating the beginning of the tape indicated by the beginning of tape holes; locating a first data zone as indicated by the existence of a single load point hole about 30 inches from the nearest set of beginning of tape holes; measuring the length of tape between the beginning of the tape and the first data zone; determining whether the length of tape between the beginning of the tape and the first data zone is between 28 and 32 inches; if the length of the tape is more than 32 inches, identifying the tape as an invalid media type; if the length of the tape is between 28 and 32 inches, determining whether tape identification holes are embedded in the tape; if no tape identification holes are embedded in the tape, identifying the tape as an invalid media type; if the tape identification holes are present, determining whether the tape identification holes are in octal 06 arrangement; if the holes are not in octal 06 arrangement, identifying that the tape cartridge as an invalid media type; if the holes are in octal 06 arrangement, identifying the tape as one capable of providing random access storage.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF PREFERRED EMBODIMENT

The present invention provides a tape cartridge that has special detection markings so as to be recognized by and operate with a specially designed random access tape drive. Further, the invention provides a system and method for detecting when the tape cartridge has been inserted in the system.

There is described herein a method and apparatus for speeding access to selected files on a tape and for partitioning a single tape for use as both a primary and secondary storage device. On one partition, data is stored in random access format and the partition is sized such that this partition of the tape can provide much faster access than a tape without partitions, allowing the tape to operate more like a primary storage device. On another partition, data is stored and accessed according to more conventional sequential access standards. This other partition is sufficiently long so that back-up and other secondary storage functions can still be performed on the same tape.

Figure 1:
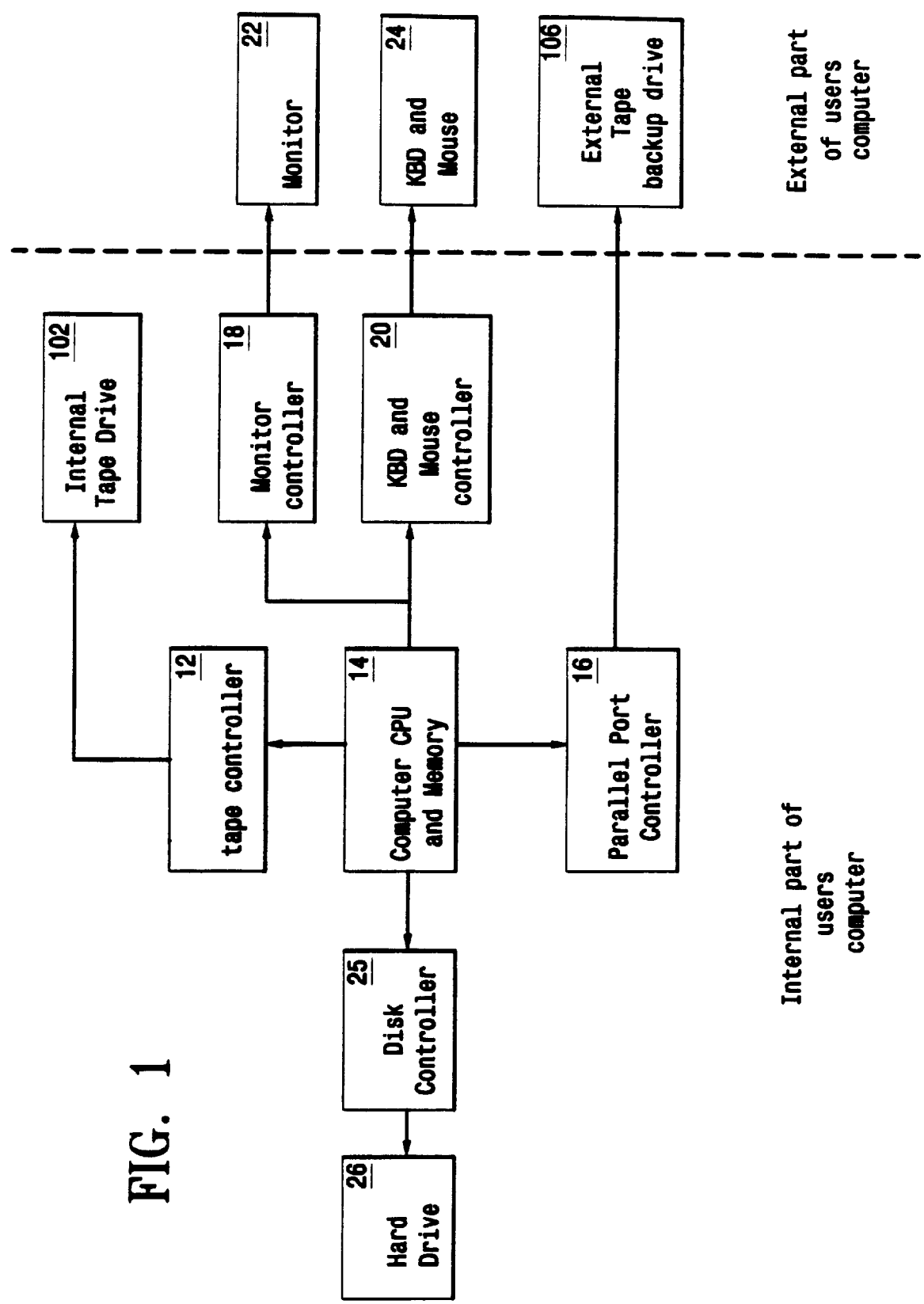
FIG. 1 is a block diagram of a computer system with a tape drive system.

FIG. 1 is a block diagram of an exemplary computer system with a tape drive system. As shown, the computer system is divided between internal and external components. The internal components include a CPU and memory 14 that control the overall functioning of the computer system. A tape controller 12 is connected between the CPU and memory 14 and an internal tape drive 10a. A hard disk drive 26 is also connected to CPU and memory 14. A disk controller 25 provides the interface between hard disk 26 and CPU and memory 14. Other controller are connected to CPU and memory 14 to provide an interface between a variety of external devices and CPU and memory 14. For example, a parallel port controller 16, a monitor controller 18, and a keyboard and mouse controller 20 each provide an interface between CPU and memory 14 and external tape drive 10b, monitor 22, and key board and mouse device 24, respectively.

The exemplary system of FIG. 1 is configured with two tape drives 10 to emphasize that a drive 10 can be implemented in either internal or external form. However, unlike the system depicted in FIG. 1, many computer systems will likely contain only an internal drive 10a or an external drive 10b, but not both.

The computer system functions generally similar to the functioning of a standard computer system. An operating system, programs, and data files are stored on hard drive 26 for execution on CPU and memory 14. User interaction with the systems is provided by Keyboard and Mouse 24 and visual output is provided via monitor 22. As explained more fully below, tape drive 10 provides dual functionality of allowing the user to backup the files on hard disk drive 26 and to use tape drive 10 as a random access device, much like hard disk drive 26. CPU and memory 14 interact with the tape drive 10a and 10b to store files, back-up hard disk drive 25, and so on.

Figure 2:
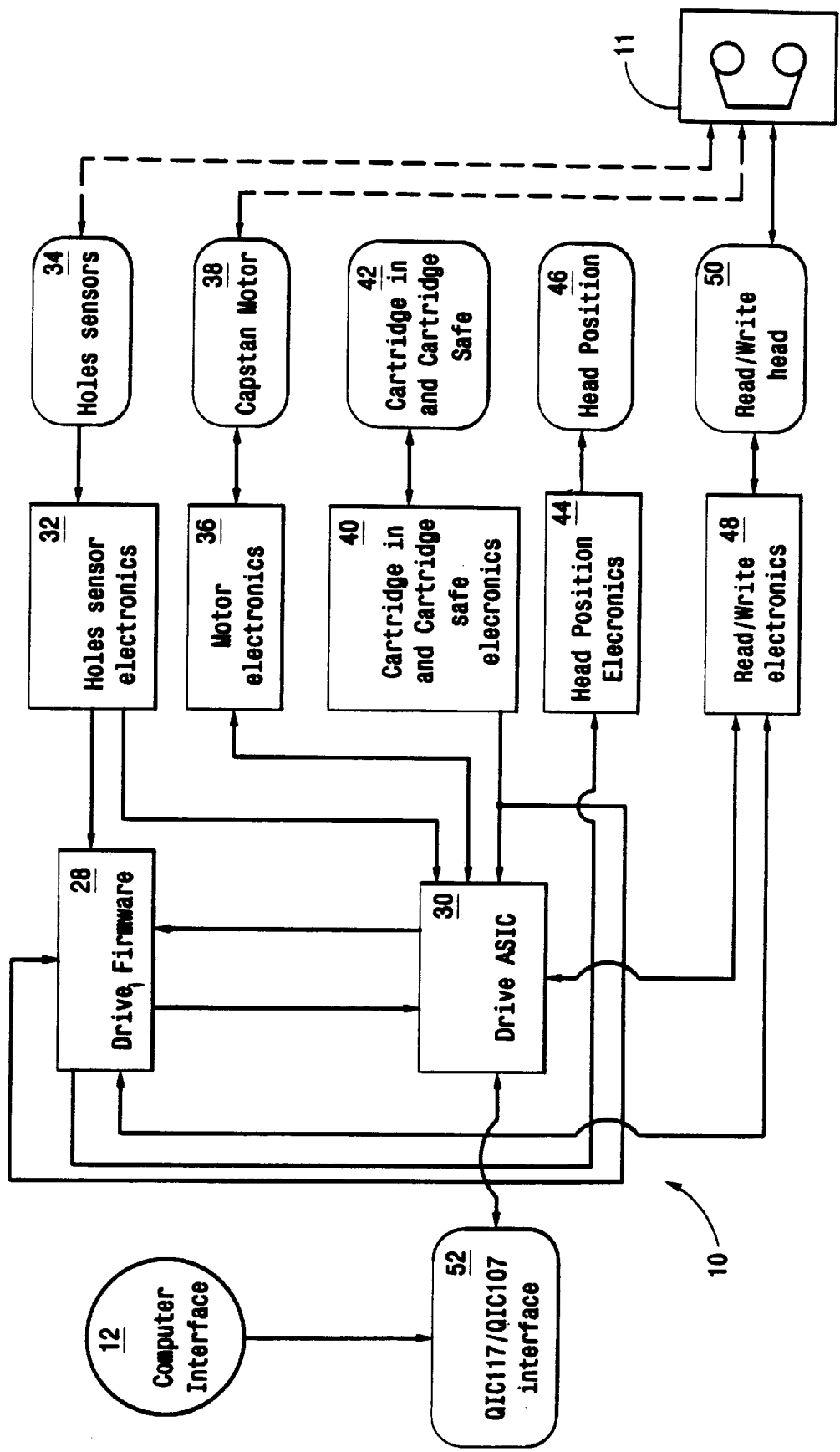
FIG. 2 is a block diagram of a tape drive system.

Further details of tape drive 10 are shown in a block diagram form in FIG. 2. The tape drive system comprises two major components: A tape cartridge 11, which is further described below with reference to FIG. 3, and a tape drive 10. The drive electronics include a standard QIC117/QIC107 interface that comports with the QIC interface standard requirements, such as pin locations and voltage requirements, a drive application specific integrated circuit (ASIC) 30, which contains a microprocessor, memory, interface support circuitry, and other supporting circuitry, drive firmware 28, which contains program code to implement various drive functions, as described in further detail below, and tape interface electronics. The tape interface electronics further include hole sensor electronics 32 and hole sensors 34, motor electronics 36 and motor 38, cartridge load status electronics 40 and 42, head position electronics 44 and head positioning apparatus 46, and read/write electronics 48 and read/write head 50.

The operation of tape drive system 10 is in many aspects similar to conventional tape systems. When a tape cartridge 11 is inserted into drive 10, cartridge in and cartridge safe block 42 provides an output signal to the microprocessor contained in drive ASIC 30. Read/write head 50 interfaces with cartridge 11 to read and write data in response to user requests. Head position block 46 moves head 50 across the width of the tape for alignment of head 50 with a desired track. Capstan motor 38 provides the mechanical force to the cartridge 11 to move tape past read write head 50. Hole sensors 34 detect holes located in the tape such as Beginning of Tape (BOT) holes, End of Tape (EOT) holes, and so on.

Figure 3:
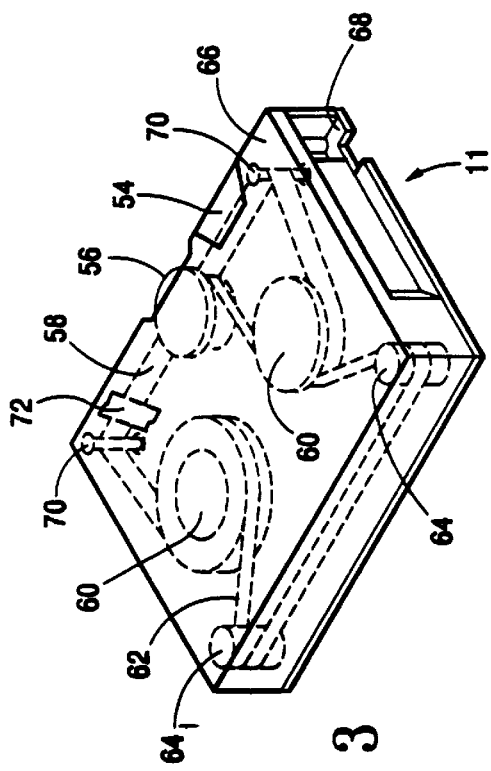
FIG. 3 is a perspective view of an exemplary tape cartridge employing aspects of the present invention.

A preferred embodiment of an exemplary tape cartridge 11 is depicted in FIG. 3. Those of ordinary skill in the art will appreciate that cartridge 11 shares many attributes of well-known and available tape cartridges. For example, cartridge 11 includes a pair of reels 60 that are rotatably disposed on a base 68 and has a length of tape 58 that is spooled around reels 60. Tape 58 follows a tape path between reels 60 that runs parallel to a head access opening 54 and around tape guides 70. A drive belt 62 follows a path around a drive capstan 56, which is rotatably disposed near a front peripheral edge of the cartridge 10, and drive rollers 64 such that a portion of belt 62 contacts the spools of tape for moving the tape back and forth between reels 60. A reflector 72, which is used to detect holes (not shown) in tape 58, is provided behind tape 58 along a front peripheral edge of cartridge 11. Lastly, a housing 66 is mounted over base 68 forming an outer shell of cartridge 11. There are other well-known components in cartridges of the type shown in FIG. 3 that are left out of the present description for clarity an brevity.

The operation of the tape system is best described with reference to FIGS. 2 and 3 together. Read/write head 50 of drive 10 engages the length of tape 58 of cartridge 11 at head access opening 54. Capstan motor 38 engages capstan 56 causing belt 62 to move across tape spools 60 thereby moving the tape 58 across read/write head 50. Hole sensor 34 operates in conjunction with reflector 72 to detect holes embedded through tape 58. As is described more fully below, predefined hole patterns are disposed along a predetermined length of tape 58 to indicate features of tape cartridge 11 in accordance with the present invention.

Figure 4:
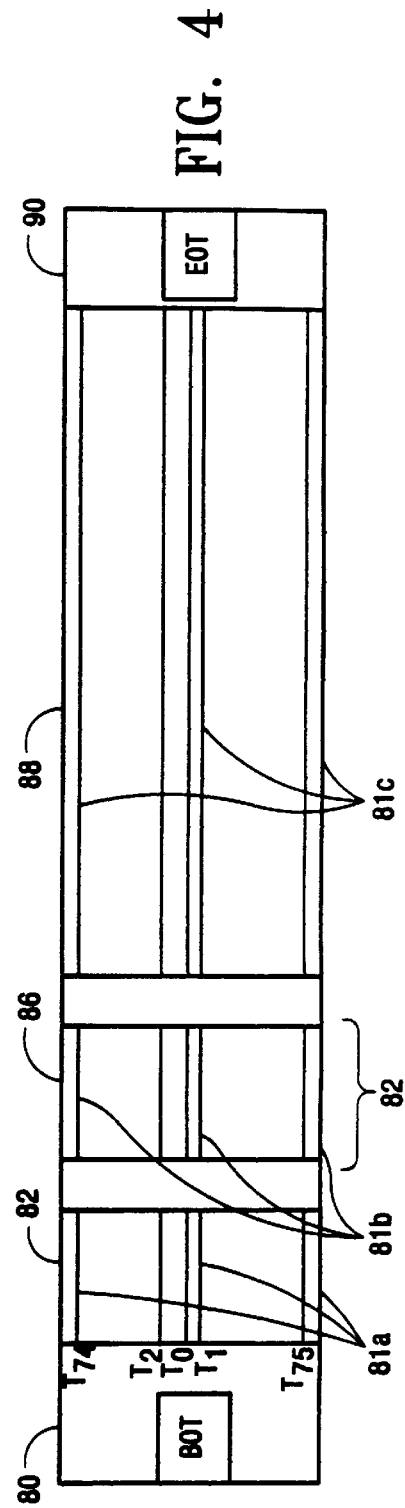
FIG. 4 is a diagram of the layout of a tape in accordance with the present invention.

FIG. 4 is a diagram of the partitioning of the length of tape 58 contained within cartridge 11. Tape 58, like most tapes, contains a beginning of tape (BOT) region 80 and an end of tape (EOT) region 90. More significantly, tape 58 is divided between random access (RA) 82, 86 and sequential access 88 (Backup Zone) partitions. The exemplary configuration shown in FIG. 4 provides two random access partitions and one sequential access partition. However, other configurations are possible, such as a single random access partition and a single sequential access partition. A head park zone 84 is provided between each partition.

A key feature of the present system is that the random access partitions 82, 84 are sized to provide fast access times. Most tape systems have tracks that run the entire length of the tape in a serpentine fashion. For example, even tracks (e.g., track T0, T2, and so on) are read in a first direction along the entire length of the tape and odd tracks (e.g., track T1) are read in the opposite direction along the entire length of the tape. Here, however, the tape is partitioned with a smaller random access partition or partitions (82, 84), so that the tracks are read in a serpentine fashion only up to the end of the partition and then back to the beginning of the partition. Thus for example, information would be recorded in partition 0 on section 81a only, and in partition 1 on section 81b only and so on. If the partition is sufficiently short (e.g., 45 feet versus 1000 feet), the access time for any particular file in the random access partition is significantly reduced. For example, in a drive that can move tape at 85 inches per second, file access time will be reduced to a maximum of about 6.5 seconds for a partition size of 45 feet versus 140 seconds for a 1000 foot partition.

As noted above, tape cartridges can contain in excess of 1000 feet of tape and, consequently, a 45 foot partition is a small percentage of the total available tape. As a result, after a providing for a small random access partition, sufficient tape remains available for additional short random access partitions and a longer sequential access backup partition. As a result, a single tape is partitioned into a random access portion and a sequential access portion. The random access portion is sufficiently short in length to allow access times that perform more like a primary storage device. By contrast, the remaining tape remains sufficiently long to store the large amount of data and files necessary to perform such secondary storage functions as hard disk back-up.

Tape cartridge 11 has a number of physical attributes that provide identification and configuration information to drive 10 so that the tape storage system can perform its dual use functions. For example, drive 10 must recognize tape cartridge 11 as a multiple partition tape. Moreover, the drive must recognize the distinct partition boundaries. Several embodiments are contemplated to achieve each of these goals.

There are two embodiments for recognizing tape cartridge 11 as a multiple partition cartridge. The first embodiment for tape identification employs a unique signature in the tape header. QIC standards require the signature bytes of the tape header to contain 55, AA, 55, AA hexadecimal. By contrast, the first tape detection embodiment would change the signature in the header to, for example, 28, 28, 28, 28 hexadecimal. This unique signature allows the drive 10 to identify the tape cartridge 11 as being formatted for multiple partition.

Figure 5A:
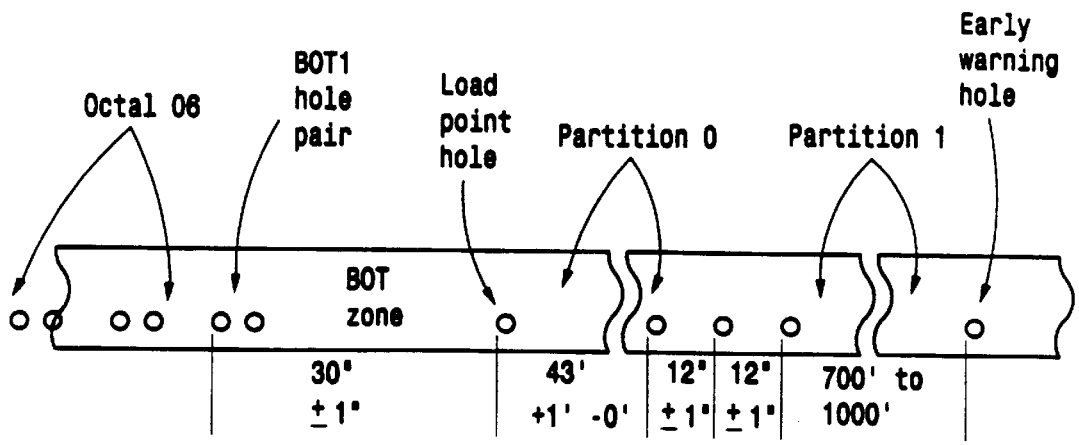
FIGS. 5A and 5B present an embodiment of a tape showing tape holes in accordance with an aspect of the present invention.
Figure 5B:
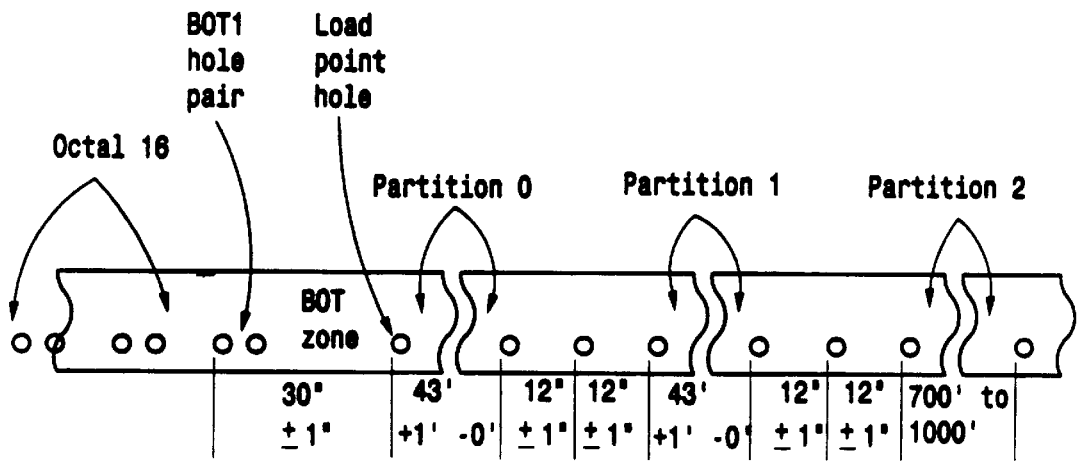
Figure 5C:
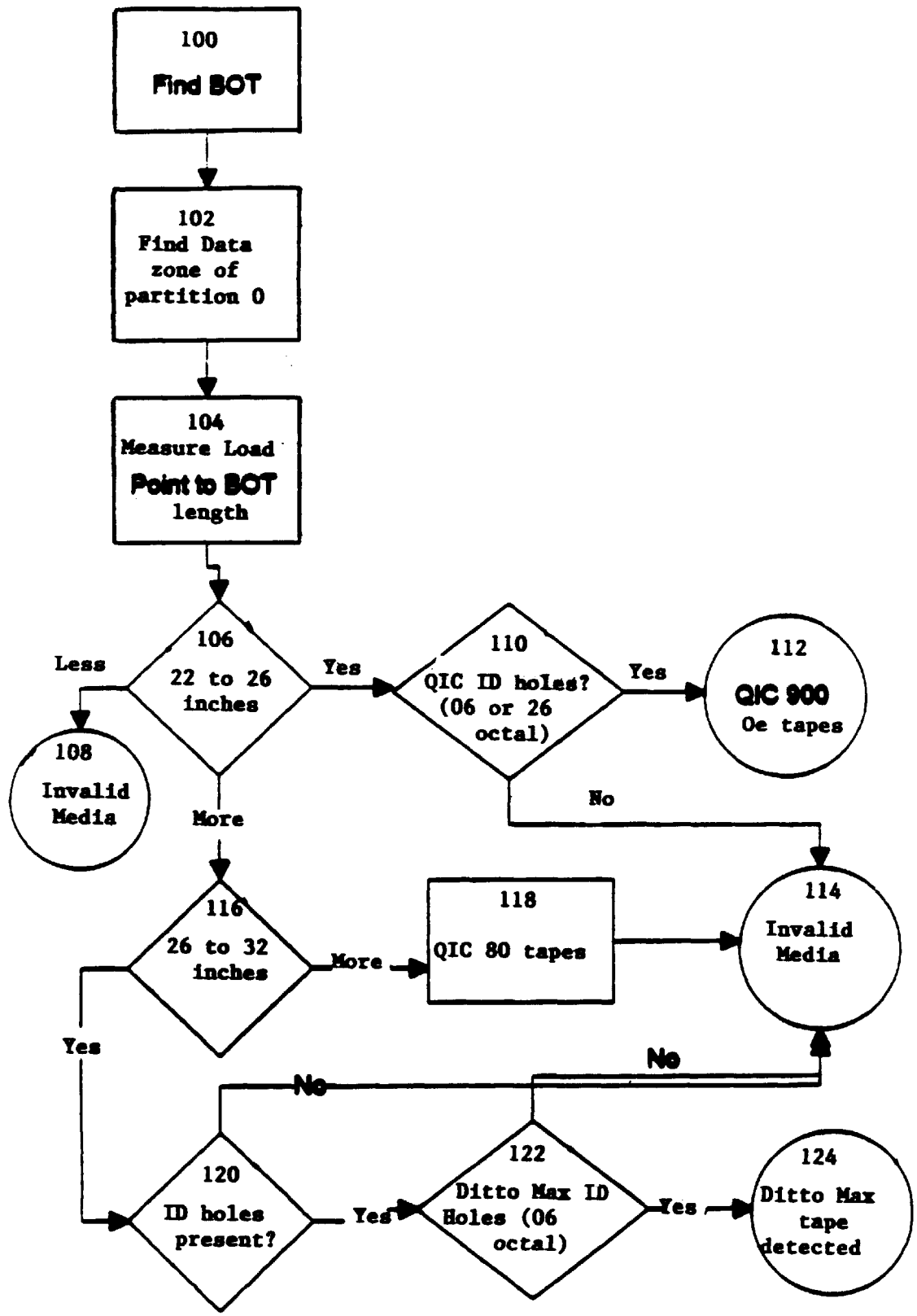
FIG. 5C presents a flow chart of an exemplary tape detection and delineation process in accordance with the present invention.

A second and preferred embodiment for detecting a tape cartridge 11 and one which is the focus of the present invention is presented with reference to FIGS. 5A, 5B and 5C. As shown in FIGS. 5A and 5B, the BOT region of tape 58 has a unique hole pattern that allows a drive 10 to recognize that the tape contains a random access partition. Preferably, the initial hole pattern is octal 06 (indicative of a single random access partition) or octal 16 (indicative of two random access partitions). Typically, such an initial hole pattern is indicative of a wide tape as defined by QIC standards. However, tape 58 that is formatted in accordance with the present invention also has a Load Point hole placed about 30 inches from the BOT1 hole pair; standard wide tape requires a Load Point hole about 24 inches from its BOT1 hole pair.

Thus, in the preferred embodiment of the invention, the inventive tape cartridge 11 has a distance between Load Point and the closest set of BOT holes of 30 inches and tape identification markings in an octal 06 arrangement. This novel combination of markings allows the drive 10 to detect the cartridge when it is inserted into drive 10. A 30 inch length of tape between the BOT and Load Point is indicative of DC2000, DC2080, and QIC80 type tapes. However, these tape types do not have octal identification markings. Therefore, a prior art tape drive attempting to read tape cartridge 11 formatted with octal 06 identification markings and a 30 inch length between the BOT1 and the Load Point will generate an error. In contrast, tape drive 10 uses the novel arrangement of markings on tape 58 to detect the tape cartridge as one having the multiple partition characteristics described above.

FIG. 5C provides a flow diagram of the inventive process of detecting a tape cartridge 1 I that has been formatted for use with inventive tape drive 10. At step 100, inventive tape drive 10 detects the BOT markings. In the preferred embodiment this is accomplished by scanning backwards along the length of tape 58 for the first set of BOT markings that are encountered. In the preferred embodiment, the markings are indicated by holes but could be electromagnetic markings as well. Thereafter, at step 102 tape drive 10 identifies the first data zone. In the preferred embodiment this is accomplished by reversing direction of tape 58 and scanning forward from the recently located BOT markings until a single hole is located that has no other holes within 36 inches. A single hole without another hole within 36 inches is determinative of a Load Point hole which represents the beginning of the first data zone. At step 104, the length of tape between the BOT and the Load Point is measured. In the preferred embodiment, this is accomplished by again reversing the scan direction measuring the distance from the recently identified Load Point hole until the first set of BOT holes are encountered.

At step 106, if the length of tape 58 from the Load Point hole and the first set of BOT holes is less than 22 inches, the tape cartridge is designated as not being supported by tape drive 10 at step 108. However, if the length is between 22 and 26 inches, at step 110 tape drive 10 checks for tape identification markings or holes. If the tape identification markings are found, at step 112 the tape is identified as a QIC-900 Oe type tape. QIC-900 Oe type tape cartridges, although they cannot be partitioned and written to in random access format as described herein, can be read by tape drive 10, i.e. drive 10 will restore files that have been previously written to the tape. If at step 110 there are no identification markings or holes, at step 114 the tape is identified as an invalid media type that is not supported by tape drive 10.

If at step 106 the length of tape between the Load Point hole and the first set of BOT holes is greater than 26 inches, at step 116 it is determined whether the length is between 28 and 32 inches. If the length is greater than 32 inches, at step 118 the tape is identified as a QIC 80 tape type. In the preferred embodiment, QIC 80 type tapes are not supported. Therefore, at step 224 any QIC 80 tape that may be encountered is identified as an invalid media type.

However, if at step 116 the length between the BOT and the Load Point is between 28 and 32 inches, this indicates that the tape cartridge might be formatted to provide random access. At step 120 it is determined whether the tape has tape identification markings. This is accomplished by continuing the scan begun in step 104 backwards along the tape. If at step 104 there are no tape identification markings, this indicates that the tape is not supported by the drive. Such tape cartridges are designated at step 114 as an invalid media. However, if at step 120 the tape is found to have identification holes, at step 122 tape drive 10 checks for whether the markings are arranged in octal 06 arrangement. If the identification markings are not in octal 06 arrangement, the tape cartridge is not supported by drive 10 and at step 114 the tape cartridge is designated as an invalid media type. However, if at step 122 the tape is found to have identification markings in octal 06 arrangement, the tape is in the preferred format of having tape identification holes and 30 inches between the BOT and the tape load point. In this case, at step 124 the tape cartridge is identified as being formatted in accordance with the preferred embodiment so as to support random access functionality.

The process of FIG. 5C is implemented in a tape drive 10 as described in connection with FIG. 2. In particular the tape drive 10 that implements the above described detection process comprises: a drive application specific integrated circuit 30 containing a microprocessor and memory; hole sensors 34 electrically connected to the integrated circuit 30; hole sensor electronics 32 electrically connected to the hole sensors 34 and integrated circuit 30; capstan motor 38, motor electronics 36 electrically connected to the capstan motor and the integrated circuit 30, and firmware 28 electrically connected to the integrated circuit 30 and hole sensor electronics 32. The firmware 32 contains program code for executing the above described steps which is loaded into the memory and executed by the microprocessor of the integrated circuit 30.

In addition to recognizing the tape type, drive 10 in conjunction with cartridge 11 employs a mechanism to identify the partition location along the length of tape 58. Two embodiments are contemplated for partitioning tape 58 into random access and sequential access partitions. The first embodiment is also described with reference to FIGS. 5A and 5B. As shown, after the Load Point hole, partition 0 begins. Preferably, this first partition is the random access partition. The desired length of tape is allocated to the first partition (e.g., 43 feet), followed by parking zone (see parking zone 84 in FIG. 4). In the first embodiment, the parking zone is indicated by a series of three holes spaced about 12 inches apart. These three holes are indicative of the division between partition 0 and partition 1. Similarly, for a tape configured with two random access partitions (FIG. 5B). A second series of partition dividing holes define a parking zone between partition 1 from partition 2. In either case, the sequential access partition follows the last parking zone. And, an Early Warning Hole marks the approaching end of the tape.

The second embodiment employs a soft partition of tape 58. In a soft partition, the drive electronics record a electromagnetic signal that can also be detected by the drive electronics. Because the drive records the signal to indicate the parking zone at any desired location, this second embodiment is more flexible than a fixed hole in the tape to indicate partition location. For example, the system could query a user for a partition size and thereafter determine where along the length of tape 58 to record the signal.

Figure 6:
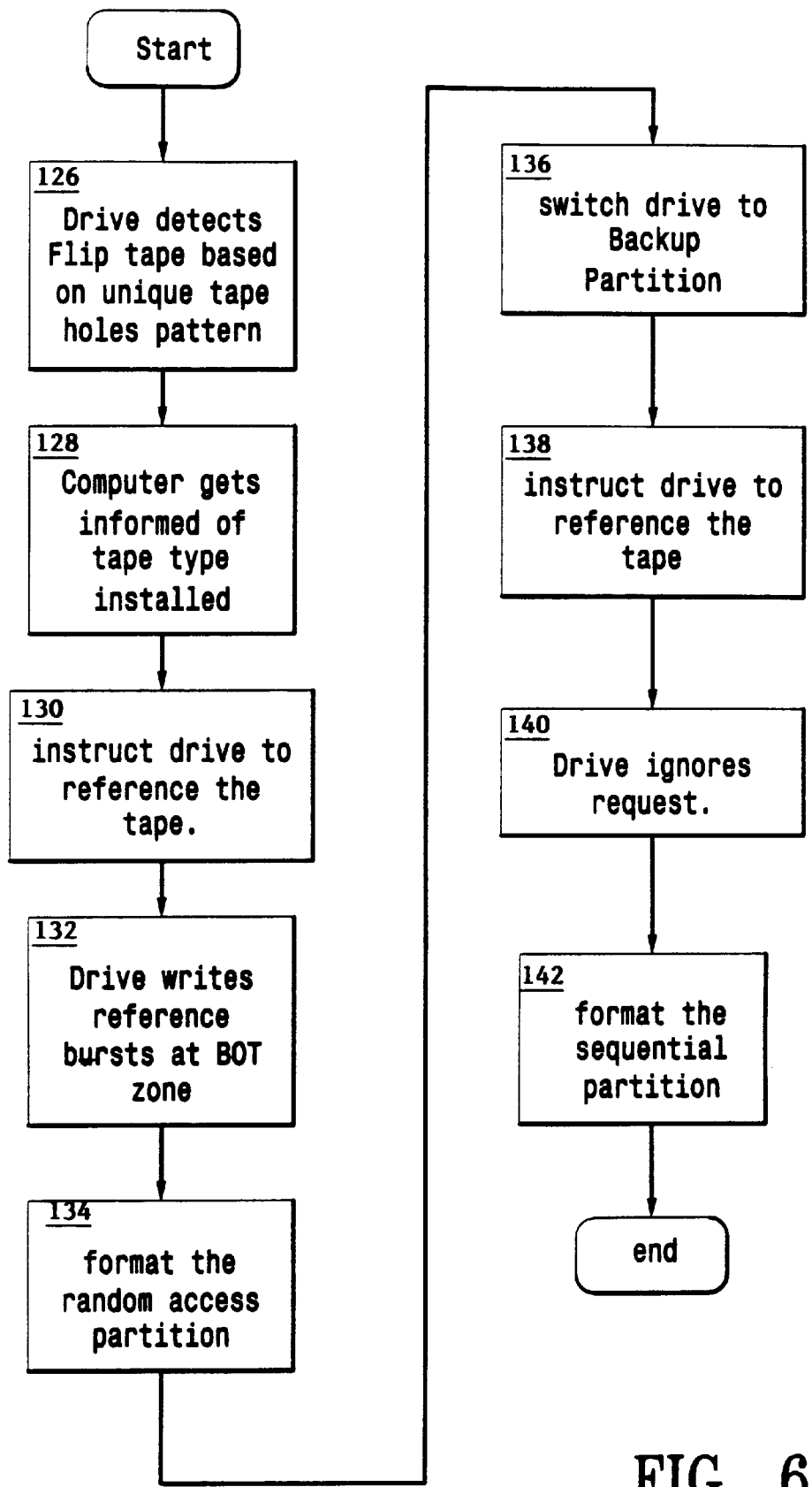
FIG. 6 presents a flow chart of an exemplary format process of a dual-format tape.

FIG. 6 presents a flow chart of the process of formatting a tape cartridge 11. Initially, a tape cartridge 11 is inserted into drive 10 and is rewound. Thereafter, drive 10 determines that cartridge 10 is of the multiple partition variety by, for example, sensing the unique BOT region hole pattern (step 126). Drive 10, having detected a multiple partition tape, informs the computer system (128). The computer system, which recognizes a valid tape cartridge type is installed, commands drive 10 to reference tape 58 (step 130). Here, the reference bursts are placed on a tape much like a conventional tape format. That is, reference burst are laid down to identify the positioning of tracks along the width of the tape. One reference burst is used to reference forward direction tracks and one reference burst is used to reference reverse direction tracks. The reference bursts are placed in tape 58 between the BOT1 holes and the Load Point hole (step 132). After the reference bursts are properly written, drive 10 is instructed to format the random access partition (step 134). Formatting is completed according to standard tape formatting procedure with the caveat that the partition is formatted as if the tape was only as long as the first partition (e.g., 45 feet). The second and subsequent partitions are not yet formatted. After the first partition is formatted, drive 10 is instructed to switch to the next partition (step 136). Drive 10 is then instructed to reference the tape (step 138). Because the second partition uses the same reference bursts as the first partition, and those burst were already placed on tape 58, the request is ignored (step 140). The backup partition is then formatted in accordance with standard tape formatting procedure (step 142). Again, however, the formatting proceeds as if the second partition were the entire tape. The formatting is then completed for a two partition tape. Similar steps would be repeated for more partitions.

Figure 7:
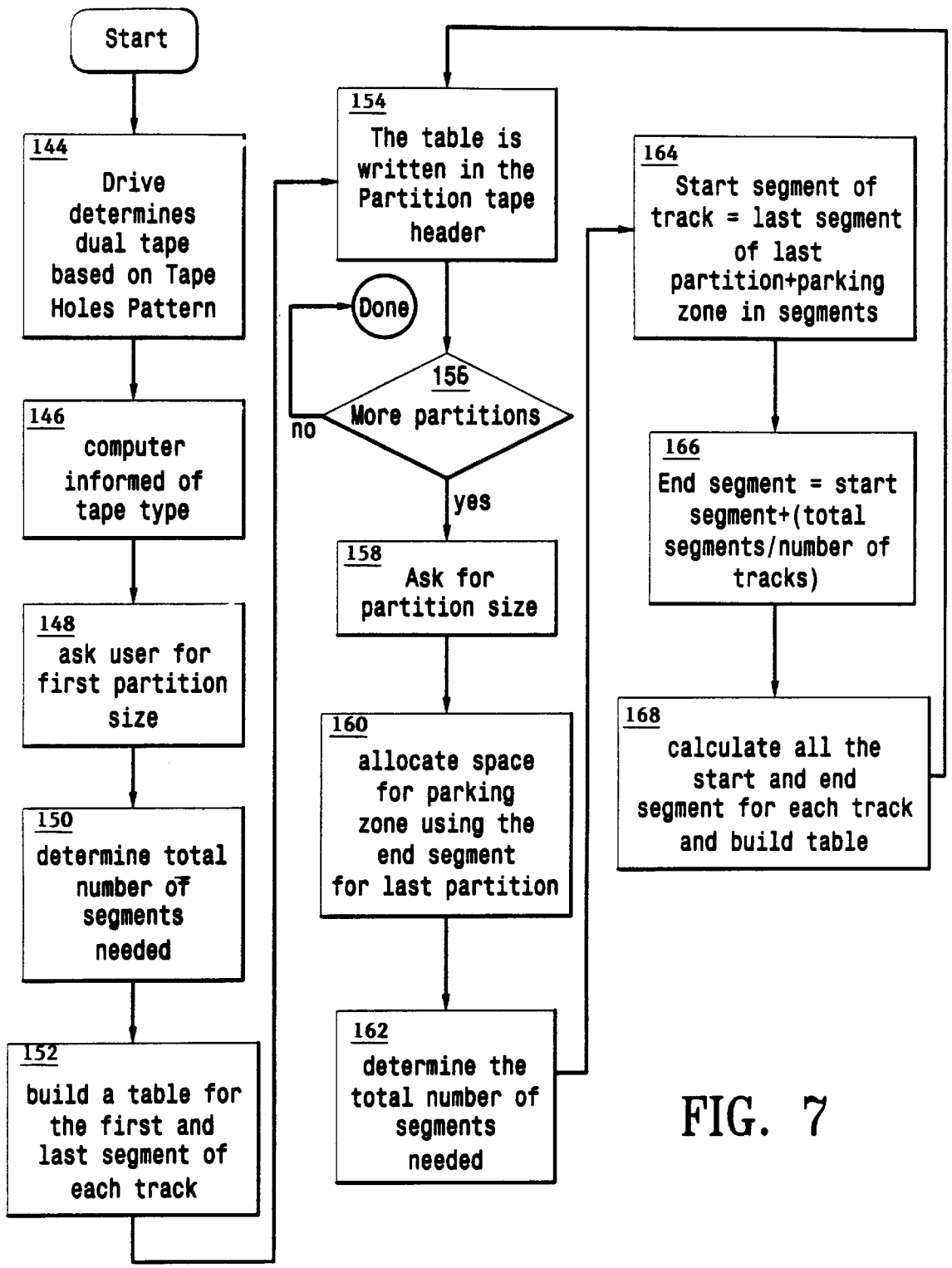
FIG. 7 presents a flow chart of a tape partition process.

FIG. 7 presents a flow chart of a process for partitioning tape 58 according to the second embodiment using a soft partition. Here, the process begin with the insertion of cartridge 11 into drive 10 and the drive detecting a multiple partition type of tape 58 by recognizing the unique hole pattern in the BOT (step 144). Drive 10 then indicates to the computer the tape type (step 146). Then, the computer queries the user for the number of partitions and the size of each partition (step 148). The total number of segments required are then determined by the track length of the partition (e.g. 45 feet) and the number of tracks divided by the segment size (step 150). A segment table is then built indicating the location of the first and last segments on each track and then written in the partition tape header (steps 152–154). If more partitions are request, the user is queried for the partition size (steps 156–158). A parking zone is allocated on the last segment of the previous partition (step 160). As with the previous partition, the total number of segments is determined (step 162). The start and end segments for the new partition are then calculated as indicated in boxes 164 and 166 of FIG. 7. The start and end segments for each track are then determined and written to the partition tape header (steps 168 and 154). This process is repeated until no more partitions are requested or no additional tape is available.

Figure 8:
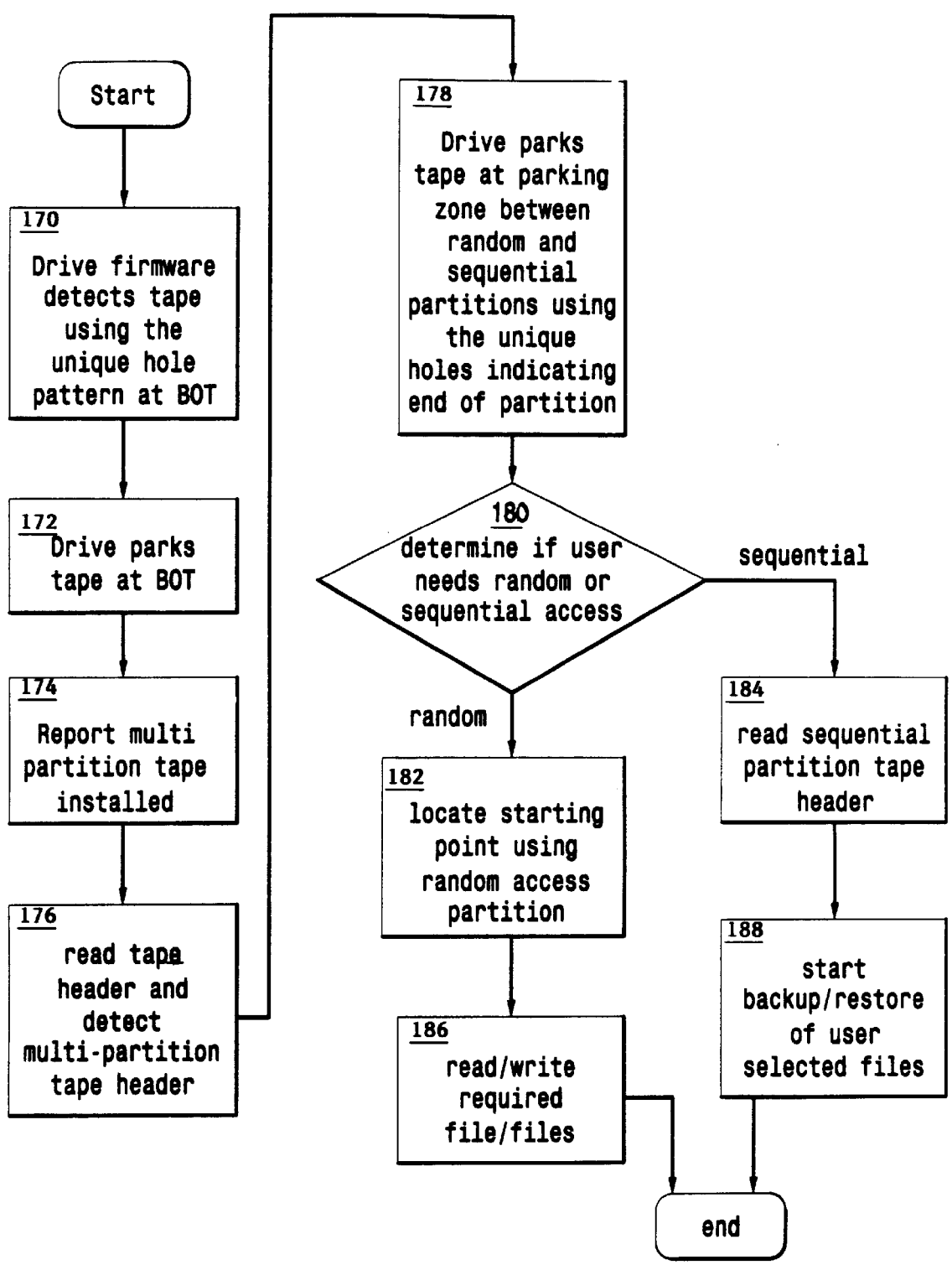
FIG. 8 presents a flow chart of an exemplary dual-formatted tape access process.

FIG. 8 presents a flow chart of a process for an exemplary tape system operation using a multiple partition tape cartridge 10. Initially, a user inserts a tape cartridge 10, and drive 10 detects a multiple partition tape by recognizing the unique hole pattern (step 170) as described above with reference to FIG. 5C. Drive 10 parks tape 58 at BOT (step 172) and informs the computer of tape type (step 174). The computer determines that the drive contains two partitions (this information is stored in the tape header) (step 176). To provide fastest access drive 10 is commanded to park the tape in the park zone between the random access partition and the sequential access partition. Drive 10 detects the park zone by searching for the park zone holes (step 178). Thereafter, when a user makes an access request for the cartridge 11, the computer determines whether the request is for the random access partition or the sequential access partition (step 180). In the case of a random access request, the read/write point in the random access partition is located (step 182) and the operation is carried out accordingly (step 186). On the other hand, if the sequential access partition is requested to perform a backup, for example, tape 58 is moved to the sequential access partition, the partition header is read and the backup proceeds within the partition according to conventional procedures (steps 184, 188).

The final steps of determining whether the request is for the random access partition or the sequential access partition could be implemented in a number of ways. For example, the user could simply select the appropriate location for the files. Alternatively, the computer or drive could automatically determine the best location for the file by, for instance, basing the decision on the file size or some other criteria. File smaller than a predetermined size would be stored on the random access partition; whereas files above a predetermined size could be written to the sequential access partition. Or, some other file allocation method could be used based on a usage function, such as least recently used and so on.

The above description of preferred embodiments is not intended to impliedly limit the scope of protection of the following claims. Thus, for example, except where they are expressly so limited, the following claims are not limited to applications involving tape drive systems.

What is claimed is:

1. A magnetic tape cartridge, comprising:

first and second reels;

a length of tape extending along a predefined tape path between said first and second reels;

partition means embedded in said tape indicating a division in said tape between a first partition along a part of the length of tape and a second partition along another part of the length of tape, one of said first and second partition being accessed according to a random access format and an other one of said first and second partition being accessed according to a sequential access format;

a load point hole situated about 30 inches away along said length of tape from the nearest set of beginning of tape holes; and a plurality of tape identification holes in octal 06 arrangement situated in said length of tape wherein said load point hole and said plurality of tape identification holes indicate that the length of tape contains one partition being accessed according to a random access format and another portion being accessed according to a sequential format.

2. The magnetic tape cartridge of claim 1 wherein said partition means comprises an electromagnetic signature.

3. The magnetic tape cartridge of claim 2 wherein said electromagnetic signature identifies the location of a parking zone.

4. The magnetic tape cartridge of claim 1 wherein said partition means comprises a series of holes in said tape.

5. The magnetic tape cartridge of claim 4 wherein said series of holes comprises three holes.

6. The magnetic tape cartridge of claim 5 wherein said three holes are spaced about 12 inches apart.

7. A magnetic tape cartridge, comprising:

first and second reels;

a length of tape extending along a predefined tape path between said first and second reels, wherein said length of tape has a tape header embedded therein;

partition means embedded in said tape indicating a division in said tape between a first partition along a part of the length of tape and a second partition along another part of the length of tape, one of said first and second partition being accessed according to a random access format and an other one of said first and second partition being accessed according to a sequential access format; and an electromagnetic signature of 28, 28, 28, 28 hexadecimal embedded in the tape header, said electro-magnetic signature indicating that the length of tape contains one partition being accessed according to a random access format and another portion being accessed according to a sequential format.

8. The magnetic tape cartridge of claim 7 wherein said partition means comprises an electro-magnetic signature.

9. The magnetic tape cartridge of claim 8 wherein said electro-magnetic signature identifies the location of a parking zone.

10. The magnetic tape cartridge of claim 7 wherein said partition means comprises a series of holes in said tape.

11. The magnetic tape cartridge of claim 10 wherein said series of holes comprises three holes.

12. The magnetic tape cartridge of claim 11 wherein said three holes are spaced about 12 inches apart.

13. A tape drive system for providing digital data storage on a magnetic medium, comprising:

a tape cartridge having first and second reels with a length of tape extending along a predefined tape path between said first and second reels, partition means embedded in said tape indicating a division in said tape between a first partition along a part of the length of tape and a second partition along an other part of the length of tape, one of said first and second partition being accessed according to a random access format and an other one of said first and second partition being accessed according to a sequential access format, a tape cartridge detection means embedded in a recording surface of said length of tape indicating that the length of tape contains one partition being accessed according to a random access format and another portion being accessed according to a sequential format wherein said tape cartridge detection means comprises a plurality of tape identification holes in octal 06 arrangement and a load point hole situated about 30 inches away along said length of tape from the nearest set of tape identification holes, situated in said length of tape; and, a drive for reading said tape cartridge, said drive comprising a tape identification transducer for scanning said tape detection means embedded in said tape.

14. A method of detecting a tape cartridge having first and second reels with a length of tape extending along a predefined path between the first and second reels, a detection means embedded in a recording surface of said length of tape indicating that the length of tape contains one partition being accessed according to a random access format and another portion being accessed according to a sequential format wherein said tape cartridge detection means comprises tape identification holes in octal 06 arrangement and a load point hole situated about 30 inches away along said length of tape from the nearest set of beginning of tape holes situated in said length of tape, comprising the steps of:

detecting beginning of tape holes;

detecting a single load point hole about 30 inches from the nearest set of beginning of tape holes indicative of a first data zone;

measuring the length of tape between the beginning of the tape and the first data zone;

determining whether the length of tape between the beginning of the tape and the first data zone is between about 28 and 32 inches;

if the length of the tape is more than about 32 inches, identifying the tape as an invalid media type;

if the length of the tape is between about 28 and 32 inches, determining whether tape identification holes are embedded in the tape;

if no tape identification holes are embedded in the tape, identifying the tape as an invalid media type;

if the tape identification holes are present, determining whether the tape identification holes are in octal 06 arrangement;

if the holes are not in octal 06 arrangement, identifying that the tape cartridge as an invalid media type;

if the holes are in octal 06 arrangement, identifying the tape as one having a detection means embedded therein.

15. The method of detecting a tape cartridge having a detection means embedded in a recording surface as recited in claim 14, said method further comprising the steps of:

determining whether the length of the tape is between about 22 and 26 inches;

if the length of the tape is less than about 22 inches, identifying the tape as an invalid media type;

if the length of tape is between about 22 and 26 inches, determining whether the tape has identification holes in octal 06 or 26 arrangement located therein;

if the tape has identification holes in octal 06 or 26 arrangement located therein, identifying the tape cartridge as a QIC 900 Oe type tape;

if the tape does not have identification holes in octal 06 or 26 arrangement located therein, identifying the tape as an invalid media type.

16. An apparatus for detecting a tape cartridge with a detection means embedded in a recording surface of a length of tape indicating that the length of tape contains one partition being accessed according to a random access format and another portion being accessed according to a sequential format wherein the tape cartridge detection means comprises tape identification holes in octal 06 arrangement and a load point hole situated about 30 inches away along said length of tape from the nearest set of beginning of tape holes situated in said length of tape, comprising:

a drive application specific integrated circuit containing a microprocessor and memory;

a plurality of hole sensors electrically connected to said integrated circuit;

hole sensor electronics electrically connected to said hole sensors and said integrated circuit;

a capstan motor for controlling the movement of tape;

motor electronics electrically connected to said capstan motor and said integrated circuit;

and firmware electrically connected to said integrated circuit and said hole sensor electronics, wherein said firmware contains program code for executing the following steps:

locating the beginning of the tape indicated by the beginning of tape holes;

locating a first data zone as indicated by the existence of a single load point hole about 30 inches from the nearest set of beginning of tape holes;

measuring the length of tape between the beginning of the tape and the first data zone;

determining whether the length of tape between the beginning of the tape and the first data zone is between about 28 and 32 inches;

if the length of the tape is more than about 32 inches, identifying the tape as an invalid media type;

if the length of the tape is between about 28 and 32 inches, determining whether tape identification holes are embedded in the tape;

if no tape identification holes are embedded in the tape, identifying the tape as an invalid media type;

if the tape identification holes are present, determining whether the tape identification holes are in octal 06 arrangement;

if the holes are not in octal 06 arrangement, identifying that the tape cartridge as an invalid media type;

if the holes are in octal 06 arrangement, identifying the tape as one having a detection means embedded therein.

17. The apparatus of claim 16, wherein said firmware further contains program code for executing the following steps:

determining whether the length of the tape is between about 22 and 26 inches;

if the length of the tape is less than about 22 inches, identifying the tape as an invalid media type;

if the length of tape is between about 22 and 26 inches, determining whether the tape has identification holes in octal 06 or 26 arrangement located therein;

if the tape has identification holes in octal 06 or 26 arrangement located therein, identifying the tape cartridge as a QIC 900 Oe type tape;

if the tape does not have identification holes in octal 06 or 26 arrangement located therein, identifying the tape as an invalid media type.

* * * * *

UNITED STATES PATENT AND TRADEMARK OFFICE
CERTIFICATE OF CORRECTION

PATENT NO. : 6,031,698
DATED : February 29, 2000
INVENTOR(S) : Refael Bar

It is certified that error appears in the above-identified patent and that said Letters Patent is hereby corrected as shown below:

Col. 7, line 58, "1I" should be -11-.

Signed and Sealed this

Second Day of January, 2001

Attest:

Attesting Officer

Q. TODD DICKINSON
Commissioner of Patents and Trademarks